Patented June 24, 1952

2,601,235

UNITED STATES PATENT OFFICE 2,601,235

PROCESS FOR PRODUCING BUILT-UP SILICA PARTICLES

Guy B. Alexander, Parma, Ralph K. Iler, Cleveland Heights, and Frederick J. Wolter, Cleveland, Ohio, assignors to E. I. du Pont de Nemours & Company, Wilmington, Del., a corporation of Delaware No Drawing. Application June 15, 1949, Serial No. 99,350

7 Claims. (Cl. 23—182)

This invention relates to built-up silica and more particularly to processes in which nuclei of high molecular weight silica, preferably made by heating a heel of silica sol above 60° C., are mixed with an aqueous dispersion of active silica made by mixing an alkali metal silicate solution with enough acid to give a pH of 8 to 10.7, the alkali metal ion concentration being below 1 normal in the presence of the active silica, and heating the mixture of nuclei and active silica above 60° C. at a pH of 8 to 10.7, whereby the active silica accretes to the nuclei producing built-up products.

Various processes have already been suggested for making silica or silicic acid products by neutralizing sodium silicate with an acid. The methods usually produce silica sols which in a short time set up to gels. In the transition from sol to gel the colloidal silica particles lose their character as ultimate, discrete particles and become an indistinguishable part of the unitary, relatively rigid, fixed gel structure. The silica gel has been precipitated, according to some processes, in finely divided form—that is, as microgel, through the use of agitation, but it has not hitherto been recognized that any control could be exercised over the character of growth of the silica particles. In other words, certain conditions were known or believed to produce silica gel, and any modifications of such conditions were only believed capable of changing the physical properties of the products such as their size, the basic chemical structure of the silica remaining unchanged. Similarly, after-treatments of formed silica particles such as microgels have been proposed, but these obviously do not involve a change in the chemical character of the silica being treated.

It is an object of this invention to provide process for producing built-up silica products. Another object is to provide processes in which nuclei of high molecular weight silica are built up with amorphous silica by accretion. Another object is to provide processes for producing finely divided silica in the form of particles built up with dense, amorphous silica by accretion. Other objects are to provide processes in which build-up of dense silica particles is effected by adding acid and a soluble silicate to nuclei of high molecular weight silica, the yield of product is high, and the product consists of dense, ultimate particles of relatively uniform size. A further object is to provide processes for producing fine silica in a form useful for incorporation into rubber as a reenforcing filler. Other objects will appear hereinafter.

The foregoing and other objects are accomplished according to this invention by processes comprising mixing nuclei of high molecular weight silica, preferably made by heating a heel of silica sol above 60° C., with an aqueous dispersion of active silica made by mixing an alkali metal silicate solution with enough acid to give a pH of 8 to 10.7, the alkali metal ion concentration being below 1 normal in the presence of the active silica, and heating the mixture of nuclei and active silica above 60° C. at a pH of 8 to 10.7, whereby the active silica accretes to the nuclei.

In the processes of this invention active silica accretes to suitable nuclei to effect build-up. As used herein, the word "accrete" refers to a growing together, that is, an adding on or building up by growth, and "accretion" refers to this gradual external addition. In other words, the active silica builds up upon the nuclei already present, with a corresponding growth in size of the nuclei, rather than extending the nuclei by adding new nuclei thereto. The proportion of silica accreted is not limited and may be a several fold increase over the mass of the original nuclei.

The nuclei employed in a process of this invention consist of high molecular weight silica. The nuclei must have silanol groups,

present on their surfaces, the silanol groups apparently serving as a starting point for a condensation reaction with silanol groups in the active silica added. Since all silica surfaces contain at least some silanol groups it is apparent that any polymeric silica surface may serve a nucleus for build-up. However, the active silica must be liberated in the reaction mixture at a rate not in excess of that at which the nuclei can condense with it, else the active silica will condense with itself and gelling will occur. The rate at which the nuclei can take up the active silica is proportional to the surface of such nuclei. For instance, in one liter of a 3% $SiO_2$ sol containing silica particles 30 millimicrons in diameter there is a total silica surface area in the order of 3000 square meters, whereas in a similar sol in which the particles are 1000 millimicrons in diameter the surface area is in the order of 90 square meters. Hence active silica could condense with the latter only $90/3000$ or $3/100$ as fast as with the former, assuming the silanol groups per unit surface area are equal. It is therefore preferred to employ as nuclei high molecular weight silica in finely divided form. Similarly, the processes are most effective for nuclei with surfaces containing a high proportion of silanol groups, such as is the case with high molecular weight silica freshly prepared by condensing active silica.

Such high molecular weight silica is especially advantageously made by heating a heel of silica sol above 60° C. The silica sol may be made by any of a number of methods with which the art is familiar. Methyl silicate may be hydrolyzed with water, as taught by Brimaux, Compt. rend. 98, 105 and 1434 (1884); silicon tetrachloride may be hydrolyzed with water—see Williams U. S. Patent 1,539,342; silicon sulfide may be hydrolyzed with water as taught by Fluery U. S. Patent 61,931; sodium silicate may be subjected to electro-osmosis as shown by Schwerin U. S. Patent 1,132,394; sodium silicate may be electrolyzed with a mercury cathode—see Collins U. S. Patent 1,562,940; or sodium ions may be removed from sodium silicate by ion-exchange resins as taught by Bird U. S. Patent 2,244,325 or Voorhees U. S. Patent 2,457,971.

The silica sol obtained by any of the above-enumerated methods should be heated for at least a few minutes at a temperature above 60° C. to polymerize the silica and bring it to the high molecular weight condition in which it is suitable for use as nuclei. The time required for such polymerization is inversely proportional to the temperature, being halved for each 10° C. by which the temperature exceeds 60° C.

A method which has outstanding economic advantages in the preparation of silica nuclei for use according to this invention consists in partially neutralizing a soluble silicate, such as sodium or potassium silicate, with an acid such as acetic, phosphoric, nitric, sulfamic, formic, sulfuric, hydrochloric, or carbonic, at a pH of 8 to 11. The concentration of salt formed in the reaction should be kept as low as feasible and in any event below about 1.0 normal and preferably below 0.5 normal by suitable choice of the $SiO_2:Na_2O$ ratio of the silicate used and by the dilution of the reaction medium. This is important because too much salt in the heel has a destabilizing effect on the active silica subsequently used in the build-up.

The silica nuclei prepared by heating a silicate and acid as just described have a high molecular weight, that is, above about 50,000. This is substantially higher than the molecular weight of the active silica used for build-up later in the process. The molecular weight can be determined by the light-scattering method described by Stein and Doty, Journal of the American Chemical Society, 68, 159 (1946), using a light-scattering photometer such as that described by P. P. Debye, Journal of Applied Physics, vol. 17, May, 1946, or the B. S. Light Scattering Photometer of the Phoenix Precision Instrument Company as originally described by Speiser and Brice, Journal of the Optical Society of America, vol. 36, page 364 (1946). The molecular weight may, of course, be so high as to be undeterminable by such instruments. When "molecular weight" is referred to, the weight average molecular weight is meant.

Having selected or produced suitable nuclei of high molecular weight silica, the nuclei are mixed with an aqueous dispersion of active silica according to a process of this invention. The active silica is made by mxing an alkali metal silicate solution with an acid to give a pH of 8 to 10.7. Thus the method for making active silica may be substantially the same as already described for making nuclei; however, when the active silica is liberated in the presence of the already formed nuclei, it accretes to these nuclei and new nuclei are not formed unless the rate of liberation of active silica is too high. It will be understood that by "active" silica is meant silica of low molecular weight in which polymerization by condensation between silanol groups has not proceeded to a predominant extent. Silica which is freshly liberated by acidifying a soluble silicate is in this condition.

The method for making active silica thus consists in partially neutralizing an alkali metal silicate, such as sodium or potassium silicate, with an acid such as sulfuric or hydrochloric at a pH of 8 to 10.7. This acidification occurs in the presence of the nuclei so that the liberated active silica can immediately accrete to the nuclei. This liberation and recombination of the active silica in situ permits the salt formed by the reaction to be present without causing gelling.

The amount of salt formed in the reaction plus any salt already present with the nuclei should be a total which gives an alkali metal ion concentration not in excess of 1 normal in the reaction mixture. In other words, the alkali metal ion concentration should be below 1 normal in the presence of the active silica, and preferably below 0.5 normal. This is controlled by suitable choice of the $SiO_2:Na_2O$ ratio of the silicate used and of the dilution of the reaction medium. Any dilution or concentration of the solution which occurs during the course of the reaction must be taken into account. It would, of course, be possible to remove alkali metal ions during the reaction and thus influence the alkali metal normality but under ordinary circumstances this is uneconomic.

The acid added to the silicate to make active silica in a process of this invention may be any acidulous material. It may be an aqueous solution, such as a solution of sulfuric or hydrochloric acid; it may be a gas, such as sulfur dioxide or hydrogen chloride; or it may be an acid-reacting material such as an acidic salt. When acid solutions are used, especially with the stronger acids such as mineral acids, it is especially desirable to have quite violent mixing of the acid solution and the silicate. In the case of gaseous acids, the gas may be diluted with an inert gas to assist violent mixing. Solid acids may be used, such as sulfamic and boric. The acid may be inorganic, such as phosphoric or nitric, or may be organic, such as acetic, formic, lactic, or acrylic. Hydrofluoric acid is not preferred, partly because of extreme difficulty of handling it and also because of its extreme activity which sometimes leads to local gelling. The acidulous salts, such as sodium bisulfate and sodium hydrogen phosphate can be used, but these are distinctly not preferred because they introduce alkali metal ions and tend to cause the alkali metal ion concentration to exceed 1.0 normal. Ammonium salts, such as ammonium chloride, act as acids and may be used if the ammonia formed is removed from the solution, as by steaming.

It is important to avoid local concentrations of acid. This may conveniently be done by adding the silicate at a fairly slow rate and dispersing it well through the system and then adding acid as a gas or in a fairly dilute state with vigorous agitation so as to avoid any local concentration of acid. Alternatively, the silicate and the acid are added to the heel of nuclei separately but simultaneously, with intense agitation, as by passing each of them through a pipe with intense local mixing with the heel. In another alternative, the sodium silicate is partially neutralized with acid until some 70 or 80 per cent of the alkali is neutralized and thereafter immediately there is added further quantities of acid and silicate. It is much preferred, however, to add the silicate and the acid separately to a relatively large volume of heel to prevent local concentration and possible gelling or gel formation.

The amount of acid used is such as to leave sufficient alkali in the mixture that the mixture will remain in the pH range from 8 to 10.7. Below pH 10.7 the silica is in a condition such that the particles can grow by the addition of further quantities of silica to them. Below pH 8 there is danger of gelling.

It is preferred to maintain a silica content in the heel of high molecular weight silica of from about ¼ per cent to about 5 per cent of $SiO_2$.

The acidification may, if desired, be carried on out of contact with the silica nuclei provided the active silica is caused to accrete to such nuclei before it has become inactive through polymerization—that is, before it has aged or been heated to an elevated temperature.

The active silica, in a process of this invention, is caused to accrete to the silica nuclei by mixing the active silica and nuclei and heating the mixture above 60° C. at a pH of 8 to 10.7. The mixing and heating may be effected separately, but usually it is easier and more economical to carry on these operations simultaneously. In a particularly preferred process, a heel of high molecular weight nuclei is made by heating a silica sol above 60° C., active silica is mixed therewith by simultaneously adding a silicate solution and enough acid to maintain the pH at from 8 to 10.7, and then heating to above 60° C. is continued until the desired degree of accretion has been accomplished.

The temperature of the mixture of active silica and nuclei during the accretion process is maintained above 60° C. and preferably between about 80 and 100° C. at atmospheric pressure, or at even higher temperatures at super-atmospheric pressures. The processes operate faster under pressure—that is, the rate of accretion of active silica to the nuclei occurs in a shorter time. When operating at atmospheric pressure it is preferred to operate close to the boiling point, and if the boiling point is exceeded, water may be refluxed.

The reaction rate and the temperature are related, and as the temperature increases the time required for a particular degree of accretion or build-up is reduced. For a particular set of conditions requiring 45 minutes for reaction at 95° C., the time required at other temperatures above 60° C is shown by the expression $$\left(2^{\frac{95-T}{10}} \times 45\right)$$

minutes, where T is the temperature in °C.

During the accretion process the pH is maintained in the range from 8 to 10.7. It will be understood that all pH readings are the values as determined on samples cooled to 30° C.

The amount of accretion of active silica to the high molecular weight silica nuclei may be controlled as desired. In a particularly preferred embodiment in which a soluble silicate and an acid are simultaneously added to a heel of nuclei made by heating a silica sol, the particles containing the nuclei may be built up by accretion from a size below the limit of resolution of the electron microscope—that is, below about 5 millimicrons, up to the range of from 15 to 130 millimicrons. The particles so produced are dense, substantially spherical, and surprisingly uniform in size. They are excellent rubber fillers.

The built-up silica products produced according to a process of this invention may be obtained as precipitates or as dispersions of colloidal particles—that is, as sols, depending upon the particular conditions employed, the nuclei used, and the degree of accretion or build-up. The precipitates may be filtered off, washed, and dried to obtain products consisting of the build-up particles. The particles may be agglomerated by surface forces or by surface reaction during drying, but ordinarily such agglomerates are pulverulent and are easily broken down, as by milling into rubber on a rubber compounding mill.

If the built-up products are in the form of sols, they may be precipitated, if desired, by various methods. By increasing the alkali metal ion concentration substantially precipitation may be effected. Similarly, the pH affects the stability of the dispersion, a pH near 7 favoring precipitation. Alternatively, a salt of a polyvalent metal such as calcium, magnesium, or zinc may be added to coagulate the silica particles and cause them to precipitate out. Soluble salts of the metals, such as the chlorides, sulfates, nitrates, sulfamates, or other soluble salts may be used. Such precipitation with polyvalent metal salts is the subject of United States patent applications, Ser. Nos. 99,351 and 99,353, both filed June 15, 1949, by Alexander, Iler and Wolter.

The invention will be better understood by reference to the following illustrative examples:

*Example 1*

A silica sol was made by removing sodium ions from a sodium silicate solution, then adding additional sodium silicate until the $SiO_2:Na_2O$ weight ratio was about 85:1. The sol had an $SiO_2$ content of 2.2 per cent. A portion of the sol thus obtained was heated to boiling for about 10 minutes and additional portions of the dilute sol were added while continuing boiling, the total volume of boiling sol being maintained substantially constant. The evaporation at constant volume was continued until the silica content was 29 per cent by weight. The sol was then diluted back to 2 per cent $SiO_2$.

To a heel consisting of 1590 ml. of the 2 per cent sol prepared as above described there were added, simultaneously but separately, at substantially constant rate over a period of 8 hours, 2070 ml. of a sodium silicate solution made by diluting a commercial sodium silicate solution containing 29.6 per cent $SiO_2$ and having a 3.25 $SiO_2:Na_2O$ weight ratio to an $SiO_2$ content of 12 grams per 100 ml., and 6360 ml. of 0.36 normal sulfuric acid solution. The temperature of 95° C. was maintained in the reaction pot during the entire process. The pH was maintained within the range of 9.5 to 10.3 and very vigorous agitation was provided in the reaction zone.

At the end of 8 hours the silica solution was milky in appearance. The silica particles therein were precipitated by adding an equal volume of vigorously stirred solution of calcium chloride at 95° C., the calcium chloride solution containing the equivalent of 4 per cent by weight of CaO.

The precipitated fine silica was filtered off, washed with hot water, dried at 110° C. for about 7 hours, and ground to 200 mesh. The product obtained was in the form of pulverulent aggregates of substantially spherical, discrete, dense ultimate particles. As determined by approximation from electron micrographs, substantially all of the ultimate particles had an average diameter in the range of 15 to 130 millimicrons, the arithmetic mean particle was about 37 millimicrons, and 93 per cent of the ultimate particles had an average diameter in the range from 18 to 63, that is, from 0.5 to 1.7 times the mean. Chemical analysis showed that the particles contained calcium, and because the calcium was readily removed by washing with hydrochloric acid without disrupting the ultimate particles, the calcium was assumed to be surface-reacted.

*Example 2*

This illustrates a process of the invention in which the heel of original sol is made by reaction of a soluble silicate and an acid. To a reaction vessel there was added 833 ml. of water and the water was heated to 90° C. There was then rapidly added, with vigorous agitation, a sodium silicate solution containing 120 grams of $SiO_2$ per liter and having an $SiO_2:Na_2O$ weight ratio of 3.25, and 126 ml. of 0.36 N sulfuric acid. The final silica sol contained 0.5 per cent by weight of $SiO_2$ and had a pH of 9.2. This sol was heated for ½ hour at 90° C. There was then slowly added 458 ml. of the sodium silicate solution and 1374 ml. of the sulfuric acid. The final silica concentration was 2 per cent. The additions were made while maintaining the solution at a temperature of 85 to 95° C. and a pH of from 8.9 to 10.1, the final pH being 9.8. The additions were made over a period of 4¾ hours. After this time the size of ultimate particles in the system was in the range of 15 to 130 millimicrons average diameter.

The silica in the product thus obtained was precipitated by adding 400 ml. of the sol to a solution made by diluting 3.05 ml. of 2 molar calcium chloride, $CaCl_2$, with 400 ml. of water and adjusting the pH to about 10. The time of addition was about 15 minutes and the solutions were both at room temperature. A precipitate of fine silica surface-reacted with calcium was obtained by filtration. This product was dried and found to be similar to the product of Example 1.

*Example 3*

This example illustrates a process of the invention in which intermittent additions of sodium silicate are made to a heel of silica sol and the silicate is then neutralized by gradual addition of acid.

A silica sol, hereinafter referred to as sol A was prepared by adding 250 parts by weight of 0.45 normal sulfuric acid, over a period of 2 hours, to a solution of 600 parts by weight of sodium silicate containing 12 parts by weight of $SiO_2$ in the form of a 3.25 $SiO_2:Na_2O$ weight ratio sodium silicate. The final pH of the sol was 8.9.

A second sol, hereinafter referred to as sol B, was prepared by adding 250 parts by weight of 0.43 normal sulfuric acid uniformly over a period of 2½ hours to a solution containing 400 parts by weight of sol A and 200 parts by weight of sodium silicate solution which contained 12 parts by weight of $SiO_2$ in the form of sodium silicate having an $SiO_2:Na_2O$ weight ratio of 3.25. The final pH of this sol was 9.8.

A third sol, hereinafter referred to as sol C, was prepared by adding 200 parts by weight of 0.53 normal sulfuric acid uniformly over a period of 1½ hours to a solution containing 400 parts by weight of sol B and 200 parts by weight of a sodium silicate solution which contained 12 parts by weight of $SiO_2$ in the form of a sodium silicate having an $SiO_2:Na_2O$ weight ratio of 3.25. The final pH of this sol was 9.7.

A precipitate of finely divided silica was made from sol C by adding an equal volume of vigorously stirred solution of calcium chloride at 95° C., the calcium chloride solution containing the equivalent of 4 per cent by weight of CaO on the weight of the silica.

This application is a continuation-in-part of our applications, Ser. Nos. 65,526 and 65,524, filed Dec. 18, 1948, now both abandoned.

We claim:

1. In a process for producing built-up silica the steps comprising heating a heel of silica sol above 60° C. to make nuclei of high molecular weight silica, mixing said nuclei with an aqueous dispersion of active silica made by vigorously agitating an alkali metal silicate solution with enough acid to give a pH of 8 to 10.7, the alkali metal ion concentration being below 1 normal in the presence of the active silica and the rate of adding the active silica to the nuclei being not greater than that at which the nuclei can condense with it, and heating the mixture of nuclei and active silica above 60° C. at a pH of 8 to 10.7, whereby the active silica accretes to the nuclei, precipitating the silica product formed by the accretion process, and separating the precipitate from the reaction mixture.

2. In a process for producing built-up silica the steps comprising heating a heel of silica sol above 60° C. to make nuclei of high molecular weight silica, mixing said nuclei with an aqueous dispersion of active silica made by vigorously agitating an alkali metal silicate solution with enough acid to give a pH of 8 to 10.7, the alkali metal ion concentration being below 1 normal in the presence of the active silica and the rate of adding the active silica to the nuclei being not greater than that at which the nuclei can condense with it, and heating the mixture of nuclei and active silica above 90° C. at a pH of 8 to 10.7, whereby the active silica accretes to the nuclei.

3. In a process for producing built-up silica the steps comprising heating a heel of silica sol above 60° C. to make nuclei of high molecular weight silica, mixing said nuclei with an aqueous dispersion of active silica made by vigorously agitating an alkali metal silicate solution with enough acid to give a pH of 8 to 10.7, the alkali metal ion concentration being below 1 normal in the presence of the active silica and the rate of adding the active silica to the nuclei being not greater than that at which the nuclei can condense with it, and heating the mixture of nuclei and active silica above 60° C. at a pH of 8 to 10.7, whereby the active silica accretes to the nuclei.

4. In a process for producing built-up silica the steps comprising heating a heel of silica sol above 60° C. to make nuceli of high molecular weight silica, mixing said nuclei with an aqueous dispersion of active silica made by vigorously agitating an alkali metal silicate solution with enough sulfuric acid to give a pH of 8 to 10.7, the alkali metal ion concentration being below 1 normal in the presence of the active silica and the rate of adding the active silica to the nuclei being not greater than that at which the nuclei can condense with it, and heating the mixture of nuclei and active silica, above 60° C. at a pH of 8 to 10.7, whereby the active silica accretes to the nuclei.

5. In a process for producing built-up silica the steps comprising heating a heel of silica sol above 60° C. to make nuclei of high molecular weight silica, adjusting the pH of the heel to from 8 to 10.7, simultaneously adding to the heel with vigorous agitation, an alkali metal silicate solution and enough acid to maintain the pH at from 8 to 10.7, the alkali metal ion concentration of the heel being maintained below 1 normal and the heel being heated above 60° C. during said addition and the rate of adding the active silica to the nuclei being not greater than that at which the nuclei can condense with it.

6. The process for the production of a finely divided silica comprising heating a silica sol above 60° C., adding thereto with a vigorous agitation, a silicate solution and enough acid to maintain the pH at from 8 to 10.7, and continuing heating to above 60° C. and adding silicate and acid until silica particles precipitate, the metal salt concentration in the reaction mixture being not permitted to exceed 1 normal and the rate of adding the active silica to the nuclei being not greater than that at which the nuclei can condense with it.

7. In a process for producing built-up silica the steps comprising heating a heel of silica sol above 60° C. to make nuclei of high molecular weight silica, mixing said nuclei with an aqueous dispersion of active silica made by vigorously agitating an alkali metal silica solution with enough carbonic acid to give a pH of 8 to 10.7, the alkali metal ion concentration being below 1 normal in the presence of the active silica and the rate of adding the active silica to the nuclei being not greater than that at which the nuclei can condense with it, and heating the mixture of nuclei and active silica, above 60° C. at a pH of 8 to 10.7, whereby the active silica accretes to the nuclei.

GUY B. ALEXANDER.
RALPH K. ILER.
FREDERICK J. WOLTER.

REFERENCES CITED

The following references are of record in the file of this patent:

UNITED STATES PATENTS

| Number    | Name    | Date           |
|-----------|---------|----------------|
| 1,751,955 | Stoewer | Mar. 25, 1930  |
| 2,114,123 | Heuser  | Apr. 12, 1938  |
| 2,386,337 | Moyer   | Oct. 9, 1945   |

FOREIGN PATENTS

| Number  | Country       | Date          |
|---------|---------------|---------------|
| 299,483 | Great Britain | Oct. 29, 1928 |

OTHER REFERENCES

Alexander: "Colloid Chemistry," vol. VI (1946), pages 1114 and 1115.